United States Patent [19]

Doster et al.

[11] Patent Number: 5,325,953
[45] Date of Patent: Jul. 5, 1994

[54] ADAPTABLE CONVEYOR FOR MAN-LOADED CARGOS

[76] Inventors: John Doster, Rte. 1, Box 68, Saltillo, Miss. 38866; Jimmy Barnett, Rte. 1, Box 192; Joe W. Barnett, Rte. 1, Box 515, both of Nettleton, Miss. 38858

[21] Appl. No.: 975,915
[22] Filed: Nov. 13, 1992
[51] Int. Cl.$^5$ .............................................. B65G 41/00
[52] U.S. Cl. ...................... 198/304; 414/345; 414/398; 414/392; 198/311; 198/346; 198/456; 198/588; 198/592; 198/611; 198/535
[58] Field of Search ............... 198/304, 300, 311, 589, 198/588, 594, 456, 592, 607, 610, 611, 535, 536, 785, 346, 560, 524; 193/35 TE; 414/345, 347, 398, 392, 393, 395, 399, 508, 505

[56] References Cited

U.S. PATENT DOCUMENTS

| | | | |
|---|---|---|---|
| 1,863,520 | 6/1932 | Camerota | 198/785 |
| 2,212,702 | 8/1940 | Scott | 198/592 X |
| 2,613,789 | 10/1952 | McLaughlin | 193/35 TE |
| 2,793,736 | 5/1957 | Thomson | 193/35 TE |
| 3,353,652 | 11/1967 | Fellner, Jr. | 198/611 X |
| 3,420,211 | 1/1969 | Hartvickson | 198/346 X |
| 3,528,566 | 9/1970 | Weir | 198/607 X |
| 3,822,778 | 7/1974 | Coats | 198/611 X |
| 3,836,021 | 9/1974 | McWilliams | 414/398 |
| 3,954,192 | 5/1976 | Watts | 414/398 |
| 4,281,955 | 8/1981 | McWilliams | 414/398 |
| 4,312,619 | 1/1982 | Anderson et al. | 414/347 |
| 5,009,560 | 4/1991 | Ruder et al. | 414/392 |
| 5,013,204 | 5/1991 | Leon | 414/347 |

FOREIGN PATENT DOCUMENTS

| | | | |
|---|---|---|---|
| 1943778 | 3/1971 | Fed. Rep. of Germany | 198/785 |
| 3826638 | 12/1989 | Fed. Rep. of Germany | 198/785 |
| 0083903 | 4/1987 | Japan | 414/345 |
| 1206214 | 1/1986 | U.S.S.R. | 414/345 |

*Primary Examiner*—D. Glenn Dayoan
*Attorney, Agent, or Firm*—Alexander F. Norcross

[57] ABSTRACT

A multiple section conveyor for the positioning of loose items for manual loading or stacking is, in combination, a first, telescoping gravity fed conveyor connected with a second powered elevated and delivery conveyor, controlled by the arrival of objects at the end of the second powered conveyor. The combination is coupled to a mobile, powered elevating work platform, to provide cargo items to a work crew at a controlled rate and at a proper height for safest handling, over the range of motions and elevations of the work platform.

5 Claims, 3 Drawing Sheets

ADAPTABLE CONVEYOR FOR MAN-LOADED CARGOS

BACKGROUND OF THE INVENTION

This patent pertains to the field of cargo loading machinery, especially to apparatus for more efficiently loading loose items into a container or truck, where manual placement of the cargo by cargo handlers is required.

U.S. Pat. No. 3,651,963 to McWilliams discloses a conveyor for loading mail bags from a loading dock into a trailer. This conveyor system has two fixed power driven conveyors, each individually, manually controlled for on/off. The conveyors are interconnected about a hinging point so that the conveyor system (front and rear conveyors) may be moved in and out of the truck. The end conveyor is supported at a mid point by a hoisting mechanism and pivots around its rearward point so that its discharge end may be raised or lowered in the vehicle. Lateral positioning with the vehicle requires moving the entire conveyor.

U.S. Pat. No. 1,249,239 to Suffolk discloses a conveyor, for use in a coal mine for transporting bulk coal. This conveyor discloses a mechanism which shows a typical construction for a telescoping, gravity fed conveyor.

U.S. Pat. No. 2,627,960 to Eberle discloses a telescoping conveyor of the gravity fed roller type. This is described as being a truck bed loading conveyor. This patent also discloses a mechanism for temporary holding of delivered articles; operator intervention is required to deflect overflow bundles to a holding table (78). The claims of this patent are generally drawn to an extensible telescoping conveyor, with means at a work delivery end for raising and lowering the work delivery end.

U.S. Pat. No. 2,880,849 to Craggs, et el discloses a telescoping powered conveyor with means for raising and lowering the end. The claims are directed to a system of suspending the intermediate support rollers for the conveyor belt from a cable or strands, claimed to provide a self-aligning capability for centering the conveyor belt under varying loads.

U.S. Pat. No. 3,687,276 to Pelletier discloses in combination a concrete conveyor containing a multiplicity of angled or telescoping powered conveyor belts.

U.S. Pat. No. 3,134,480 to Loosli discloses a conveyor. The claim is drawn to a combination of a chain drive conveyor which can easily be driven in a small and a belt conveyor for protecting delicate produce from the chain. The patent discloses a mobile, two section conveyor having a fixed, powered section and a second, tilting powered section for delivery of produce to varying heights.

U.S. Pat. No. 3,476,089 to Jerome discloses another form of variable inclined conveyor having a single conveyor section in which there is both an upper and lower belt so as to restrain the transported object between the two belts.

U.S. Pat. No. 4,279,555 to Rydell. The structure of this conveyor includes a feed conveyor (22), an angularly variable elevator conveyor (24) and a final horizontal feed conveyor (26). It is a part of the invention that the horizontal feed conveyor 26 is maintained level even though the elevator 24 may be raised or lowered.

SUMMARY OF THE INVENTION

A combination, multiple section conveyor having a first, load centering, raised powered roller section feeds cargo items onto a descending, telescoping gravity fed conveyor. This telescoping conveyor may be extended or retracted, and ends at an interconnected, second powered elevating conveyor, which raises the cargo items to an elevated short telescoping delivery conveyor, whose height and extension is manually controlled by loading personnel to maintain the height of delivered cargo items at waist level for ease of handling. The rate of delivery of cargo items by the second powered conveyor is controlled by the arrival of objects at the second powered conveyor, as detected by a cargo sensor, such as a photo electric eye.

The delivery end of the conveyor may be linked to a moveable platform upon which cargo handlers stand, so that the conveyor is raised or lowered along with the cargo handlers. The telescoping gravity fed section extends or retracts as the moveable platform is moved. Thus cargo handlers who are filling a space, such as a truck trailer, or otherwise are working against a variable work position, may at all times have cargo items presented to them at an optimum height and position for man handling, minimizing the risk of injury from excessive twisting or lifting of cargo items for placement.

It is an object of the invention to disclose an apparatus for assisting cargo handlers to load a container, such as a truck, or an extended storage rack, by providing a continuous but controllable supply of cargo items to be stacked, presenting each item at an optimum height to lessen the strain of turning or lifting, no matter what the working height of the workmen.

It is a further object of the invention to disclose a cargo loading conveyor having a fixed entry end and a mobile loading end which may be positioned over a variety of working heights and positions as desired for best manual handling of cargo.

It is a further object of the invention to disclose a cargo loading conveyor having a fixed entry end and a mobile loading end for use in assisting the manual stacking of cargo over a considerable range of working heights.

It is a further object of the invention to disclose an apparatus which may be coupled to a mobile work platform carrying workmen, for presenting cargo items to the workmen at a constant working height as the platform is moved.

It is a further object of the invention to disclose an apparatus which may be coupled to a elevating work platform carrying workmen, for presenting cargo items to the workmen at a constant working height as the platform is raised or lowered.

DETAILED DESCRIPTION OF THE INVENTION

Figure 1:
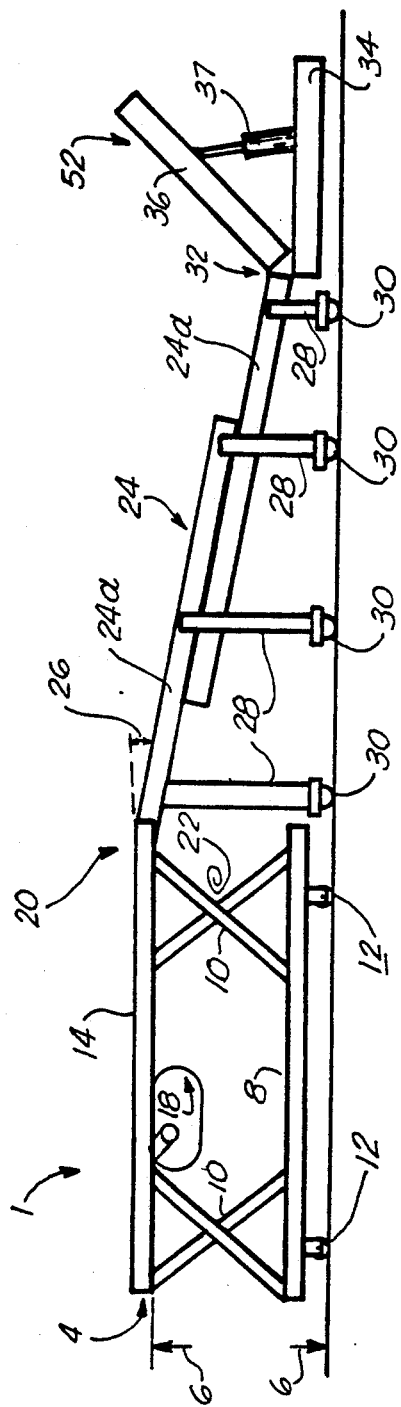
FIG. 1 is a side view of the entry section of the invention.

Referring to FIG. 1, the invention is shown at its entry end 1, for the receipt of loose items of cargo 2 to be loaded. A fixed receiving platform 4 is shown at a suitable working height 6 for manual loading of loose items 2 onto the platform 4. This working height 6 typically is about 30 inches height from the ground. The platform 4 is elevated from a base frame 8, supported above the base frame by suitable support structure such as scissors beams 10 shown. The platform 4 is movable to a work position on wheeled casters 12, and these casters may have locking brakes (not shown) to fix the position of the platform 4.

Figure 3:
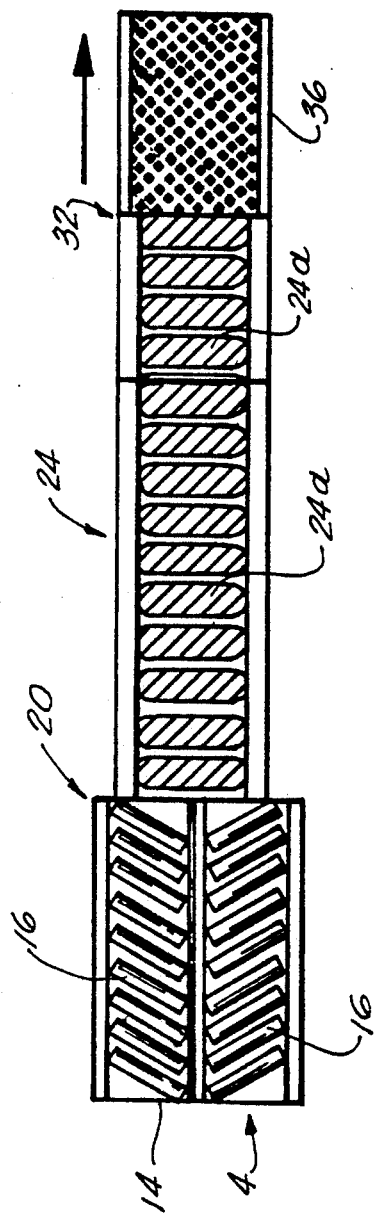
FIG. 3 is a top view of the entry section shown in FIG. 1.
Figure 2:
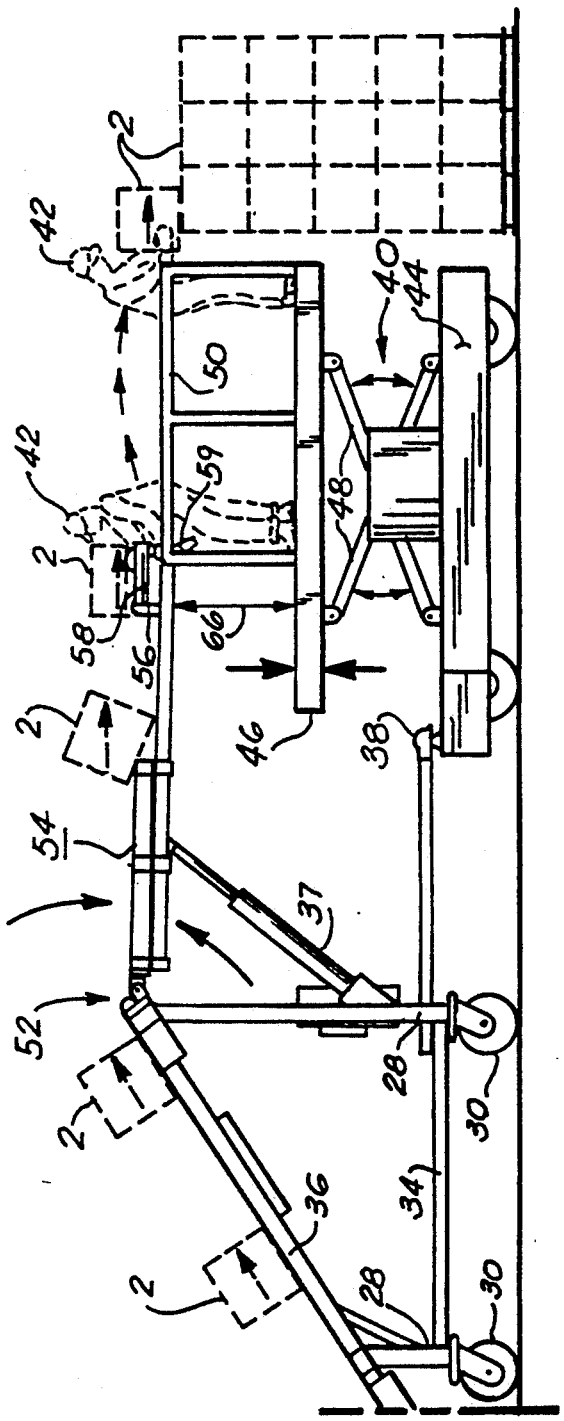
FIG. 2 is a side view of the loading end of the invention.
Figure 4:
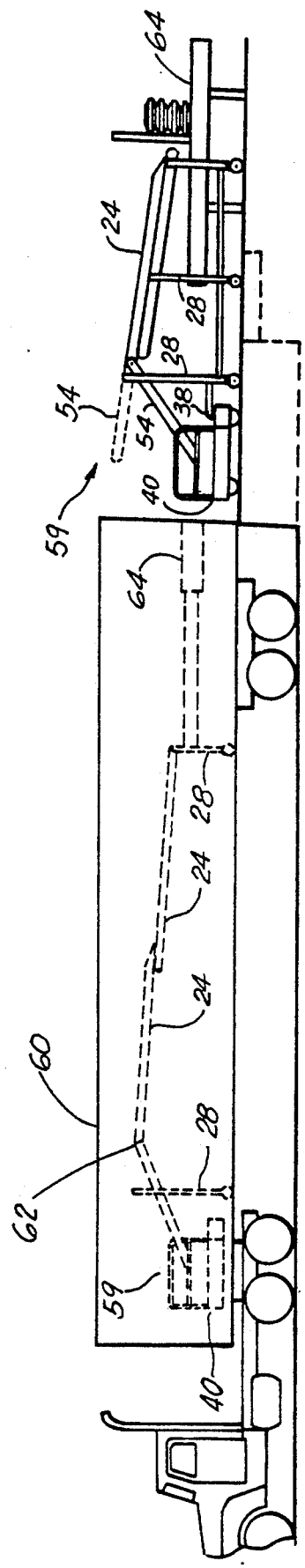
FIG. 4 is a depiction of an unloading variant of the invention.

The top surface of the platform 4 is, as shown in FIG. 3, a powered roller conveyor section 14, comprising two parallel sections of rollers 16, inwardly angled, forming an inward herringbone pattern. Power to the motor drive 18 for this platform 4 is controlled by the loading crew at the platform by means of suitable controls, which are of standard design. Typically, the power for the entry platform is by an extension cord to an electric drive motor 18, but battery power using storage batteries may also be used. Control of the entry platform 4 is independent of the control of the loading end 20 discussed below.

The support beams 10 raise the herringbone rollers 16 above the base frame 8 a distance to establish the working height 6. This creates an open space 22 which is suitable for storing, in retracted position, telescoping rollers 24. Telescoping rollers 24 are a plurality, usually two or three, of gravity roller sections 24a, each of which is clamped to its next upper section by sliding clamps (not shown) so that the sections 24a will telescope. The interconnecting clamps are set so that each section 24a will pivot about its clamp, to match the varying slope 26 of the telescoping roller 24 as the roller sections 24a are extended or retracted. Each roller section 24a is supported by vertical legs 28 having freely rotating wheels 30 at the bottom. These wheels 30 are not braked or restrained.

The lower end 32 of the telescoping rollers 24 is coupled to a wheeled base 34, shown in FIG. 3, upon which is mounted a powered elevating conveyor belt 36. The wheeled base 34 is in turn coupled by a standard trailer hitch 38 to a mobile powered work platform 40, which may be moved laterally and vertically and upon which workmen 42 may stand. This platform may be a standard electric forklift, equipped with work platform, or it may be a form of applicant's previously patented tire compression apparatus as shown in U.S. Pat. No. 4,777,781, incorporated herein by reference, showing a mobile, electrically powered apparatus having a work platform which may be elevated or lowered by scissors jacks. The exemplar work platform here shown in FIG. 3 is a battery powered motorized base 44 with wheels powered by independently controlled electric motors (not shown). Such a motorized base is known to be maneuverable in all directions and easily controlled. Erected on said base 44 is an elevating work platform 46, which is raised and lowered from said base 44 by scissors jacks 48. Safety rails 50 are provided for the workmen 42 who stand upon the elevating platform 46.

Such a powered work platform 40 is typically operated by storage batteries, powering electric drive motors; the use of internal combustion engines is not common, as dangerous fumes are given off in confined spaces, such as are encountered in container loading.

Electric power from the work platform may be coupled to the elevating conveyor belt 36, which is electrically driven; alternately electric power may be provided by a cable run along the telescoping conveyor 24, from the same loading dock power source which serves the receiving platform roller conveyor 14. Electric power also may directly drive an elevating scissors jack for raising or lowering the elevating conveyor 36, or may drive a hydraulic pump to provide a hydraulic fluid supply to an elevating positioning hydraulic ram 37.

At the upper end 52 of the elevating conveyor 36 is a short, two section telescoping roller 54 which is positioned nearly horizontally, with a slight decline. Bars 56, preferably equipped with free rollers 58, provide a stop at the end of the short telescoping roller 54. A manual lever and lock pin (not shown) locks the two roller sections 54 in relative position, permitting easy manual extension or retraction of the short section 54 as desired by the work crew.

In use, the invention is typically employed when loose items of cargo 2 must be manually loaded into a rack or stacked into a container 60, where such loading would involve lifting the cargo overhead, or where the loading crew of cargo handlers 42 would have to work from an elevated platform to reach all areas, and would have to lift the cargo items 2 into position.

The loading crew 42 stands on the mobile work platform 40 which is driven into the container 60 to the point of loading. The platform operator positions the platform 40 at the best working position and likewise elevates or lowers the elevating platform 46 to the best working height, and places the short roller section 54 to approximately waist height.

At the entry end 1 a second crew 42a loads cargo items 2 on the powered herringbone roller section 14. This entry platform 4 is at just below waist height, minimizing worker strain is lifting and loading cargo 2. The inward angle of the two sections 16 of rollers centers all cargo placed on the platform 4, allowing the cargo items 2 to be easily tossed or placed, without any particular requirements for accuracy in positioning.

The cargo items 2 are centered and moved by the entry platform 4 powered rollers 14 onto the descending telescoping section 24. The entry platform 4 is fixed in position, at a convenient place for loading. All motion of the mobile work platform 40 is taken up by relative extension of contraction of the telescoping conveyor section 24. Typically each section 24a is from ten to twenty feet long, permitting up to sixty feet of relative movement of the mobile work platform 40 for a three section conveyor.

The cargo items 2 flow down the gravity conveyor 24 to the elevating conveyor 36 where they are lifted to working height, a height selected by the loading crew 42. It is preferred that the elevating conveyor 36 is controlled by a cargo sensing means (not shown) on the short telescoping section 54 so that items 2 are raised only when an additional item 2 is needed to load. This may most easily be accomplished by a photo electric sensor 55 on the short telescoping section 54, or by a pressure sensor 57 triggered by the presence of cargo items against the end bars 56 of the conveyor.

The end of the conveyor 59 is held in fixed relative position to the mobile work platform 40 by being coupled by trailer hitch 38 to the platform 40. The loading work crew 42 can precisely position the end of the conveyor 59 for best working by manually extending or retracting the short telescoping section 54, locking it into desired position by a manual pin lock or any suitable mechanical brake.

The height of the cargo being delivered to the loading work crew is thus maintained at a optimum height, even as the crew work platform is raised or lowered as they place cargo at varying heights. The cargo is easily dragged over the end stop bars 56, due to the rollers 58 provided, and the strain on the work crew is minimized.

Use of the invention can thus be seen to significantly reduce the risk of back and other body injuries common in the cargo handling field. It can be seen form the example given that the invention provides a method of transporting loose cargo items to be manually placed in a container or in storage racks which significantly aids the work crew, by properly positioning the work crew and by presenting all items to be lifted and placed at optimum height for manual movement, minimizing stretching or excessive lifting motions.

A variation in the apparatus also serves to provide for optimal unloading of cargo from a confined or elevated storage stack. The first and second roller sections 54 which were attached to the elevating conveyor 36 are independently powered for movement of cargo; these rollers 54 may be reversible in direction or may be unidirectional, rolling away from the workmen 42. The elevating conveyor 36 may be reversed, becoming a descending conveyor, or it may be removed; the telescoping gravity conveyor section 24 is reversed, and coupled to the outer end 62 of the descending conveyor 36 or to the outer end 62 of the short telescoping roller section 54. This reversed telescoping section 24 then ends in a fixed roller platform 64 for receiving cargo.

Again, the mobile work platform 40 positions the work crew at an optimum working height with respect to the cargo being moved. The conveyor system 24, being hitched to the work platform 40, follows its motions, and the short telescoping roller section 54 is adjusted to be at all times at a proper cargo handling height 66 with respect to the workmen 42. These can then remove cargo items 2 from a stack and place them on the powered roller 54 for removal. No bending by the workmen is required, as both their work platform and the place to which they place cargo is adjustable to proper height 66 in response to their working patterns.

It should be apparent the many variations in the powering and detailed construction of the invention are possible, and that the components of the invention are known. The invention is the various combinations as claimed below of which the above as been an exemplar.

We claim:

1. An apparatus for transporting cargo items for manual positioning into a storage configuration comprising, in combination:

means, at a working height, for urging cargo items onto a conveyor;
   a plurality of non-powered telescoping roller conveyors descending from said means for urging to a powered elevating conveyor belt;
   said roller conveyors having means for free movement relative to said means for urging;
   a mobile, elevatable work platform coupled to said powered elevating conveyor belt for movement thereof;
   said powered elevating conveyor belt having a roller conveyor extension at its upper end;
   means for positioning said roller conveyor extension at a height with respect to said elevatable work platform.

2. The apparatus of claim 1, said means for urging cargo items further comprising:
   a fixed height platform;
   two parallel arrays of rollers, set at an inward angle with respect to one another;
   powered means for rotating said rollers;
   said inward angle centering cargo items placed on said rollers, for accurate placement on said telescoping conveyor.

3. The apparatus of claim 1, said roller conveyor extension further comprising:
   a first and a second roller conveyor section, each fixed for telescoping movement with respect to each other;
   said second section lockable in position relative to said first section;
   said first section being pivotally affixed to the upper end of said powered elevating conveyor belt;
   means, attached to said second section, for controlling the motion of said powered elevating conveyor belt in response to the presence of cargo items on said second section.

4. The apparatus of claim 3, said first roller conveyor section and said second roller conveyor section being powered for positive motion of cargo items thereupon.

5. An apparatus for removing cargo items requiring manual positioning from a storage container comprising, in combination:
   means, at a working height, for urging cargo items onto a conveyor, said means for urging comprising a mobile, elevatable work platform coupled to a powered descending conveyor belt having a roller conveyor extension at its upper end; said work platform adapted for vertical and lateral movement thereof; and means for positioning said roller conveyor extension at a height with respect to said elevatable work platform;
   a plurality of non-powered telescoping roller conveyors descending from said means for urging to a fixed cargo receiving point;
   at least one of said non-powered roller conveyors having means for free movement relative to said means for urging.

* * * * *